Sept. 21, 1965  E. H. EBERHARDT  3,207,997
IMAGE TUBE TARGET LOCATING DEVICE
Filed June 29, 1962  2 Sheets-Sheet 2
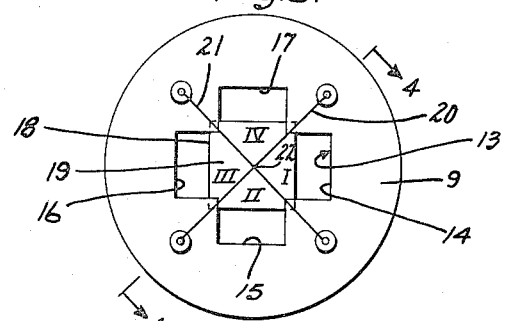
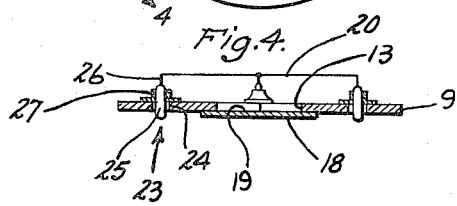
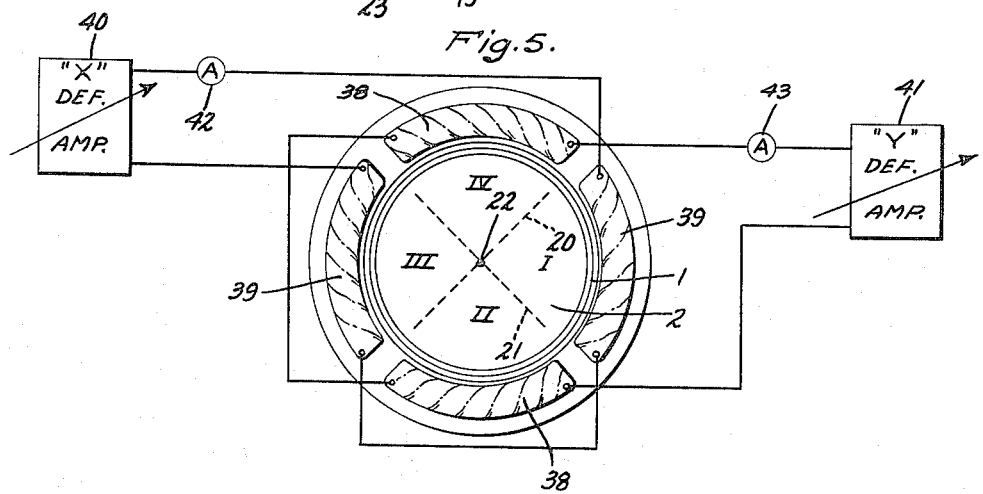
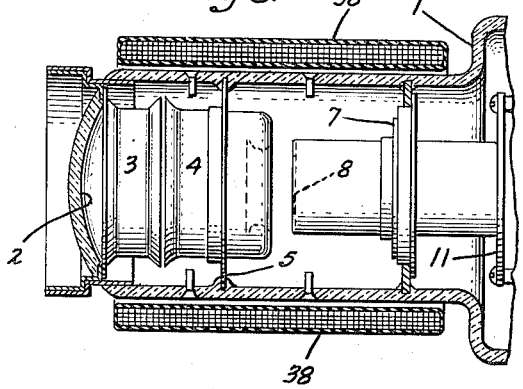
Inventor:
Edward H. Eberhardt,
by Hood, Gust & Irish
Attorneys.

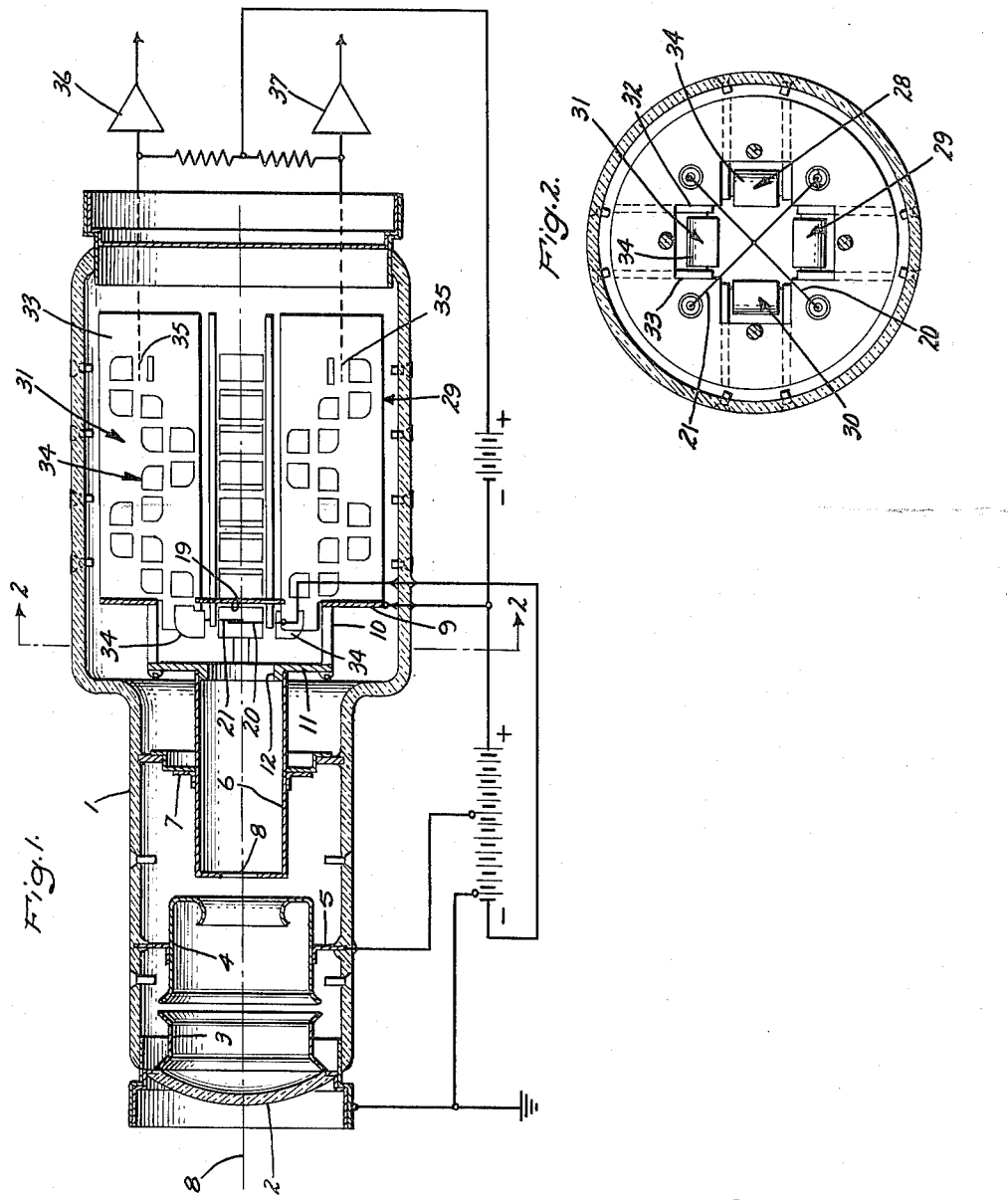

United States Patent Office 3,207,997
Patented Sept. 21, 1965

3,207,997
IMAGE TUBE TARGET LOCATING DEVICE
Edward H. Eberhardt, Fort Wayne, Ind., assignor to International Telephone and Telegraph Corporation, Nutley, N.J., a corporation of Maryland
Filed June 29, 1962, Ser. No. 206,314
7 Claims. (Cl. 328—228)

The present invention relates to a target-locating device and more particularly to an image tube and related electronic apparatus for determining the location of a remote target.

Photosensitive devices of various types have been used heretofore to provide information regarding the location of a remote target in the form, for example, of a point of light. One typical device utilized a photosensitive cathode divided into four spaced segments arranged as quadrants of a circle with four electron multipliers, respectively, operatively associated therewith such that a signal indicative of which of such segments receives a light image might be obtained. Inasmuch as these segments were spaced apart, insensitive areas between segments existed which were incapable of initiating any kind of a signal such that radiation from a distant target falling onto these areas could not be detected. Furthermore, if a spot of radiation impinged one segment of a point contiguous to an adjacent segment, it was possible for the electron emission to be picked up by the wrong electron multiplier, thereby developing erroneous information as to which segment had been initially excited. In order to avoid these difficulties, this prior art device utilized a repetitive scanning mechanism whereby the incoming radiation could be focused upon and scanned over all four of these segments to thereby excite all four multipliers according to the amount of light received by the respective segments. If one segment received more radiation than the others, its multiplier would be excited more heavily than the remaining ones, thereby providing a signal indicating this condition, this signal being representative of the quadrant location of the source of the incoming radiation.

The present invention overcomes these prior problems by providing a continuous cathode instead of a segmented one whereby there are no cathode areas which are insensitive to radiation. Furthermore, this invention eliminates the need of any kind of repetitive scanning.

It is therefore an object of this invention to provide a novel target-locating device capable of providing electrical information regarding the location of a remote target in the form, for example, of a point of light.

It is another object to provide a target locating device which includes an image tube wherein a beam of electrons, produced in response to a remote point of light, is deflected into one of four quadrant directions corresponding to the spatial position of said point of light, to thereby produce an electrical signal representative of such spatial position.

The apparatus in accordance with the present invention comprises a photo-multiplier tube having a continuous area photosensitive cathode. Means are provided for focusing an electron image produced by the photosensitive cathode into a focal plane, and immediately behind this plane is positioned a solid surface dynode which emits secondary electrons at a ratio greater than unity. Immediately ahead of this dynode surface, and lying within the aforementioned focal plane, are two wires crossed at right angles to each other which are biased slightly negatively with respect to the potential applied to the cathode. These crossed wires define four quadrants of a circle, the dynode surface lying immediately behind these quadrants thereby being correspondingly divided. An individual electron multiplier may be provided in association with each of the quadrants adjacent to the dynode surface so as to pick up secondary electrons emitted by the latter.

An electron beam originating at the photosensitive cathode and focused into the plane of the crossed wires will be deflected by the wires into only one of the quadrants unless the beam is precisely directed at the cross-over point thereof or directly at one of the two wires of a location removed from this cross-over. That portion of the dynode surface corresponding to the quadrant into which the beam is deflected will be impinged by the beam and will thereby produce secondary electrons which are picked up by the directly associated electron multiplier. This particular electron multiplier thereby produces an electrical signal which indicates the particular quadrant into which the beam has been deflected. If the beam centers on the cross-over point of the crossed wires, portions thereof will be equally divided into all four quadrants, thereby producing secondary electrons from the four quadrants of the dynode surface which will be picked up by all four of the electron multipliers. These multipliers will thereby produce signals indicative of the fact that the electron beam is positioned at the cross-over point of the wires. If the beam centers on one of the wires at a point away from the cross-over, it will divide into the two adjacent dynode quadrants producing secondaries therefrom. Signals emitted by the electron multipliers can therefore be used to indicate which of the four quadrants the electron beam has been directed into, which in turn is an indication of the spatial position of a remote target which is seen by the photocathode.

The above-mentioned and other features and objects of this invention and the manner of attaining them will become more apparent and the invention itself will be best understood by reference to the following description of an embodiment of the invention taken in conjunction with the accompanying drawings, wherein:

FIG. 1 is an axial sectional illustration of one embodiment of this invention;

FIG. 2 is a cross-section taken substantially along section line 2—2 of FIG. 1;

FIG. 3 is a view similar to FIG. 2 but with the four electron multipliers removed therefrom;

FIG. 4 is a sectional illustration taken substantially along section line 4—4 of FIG. 3;

FIG. 5 is a front end view of the tube of FIG. 1 illustrating a slightly different embodiment of this invention; and FIG. 6 is a fragmentary, axial sectional illustration of the embodiment of FIG. 5.

Referring to the drawings, and more particularly to FIG. 1, an evacuated envelope 1 is tubular and carries in its left-hand end a substantially disc-shaped photoelectric cathode 2 which may be composed of any well-known material which emits electrons in response to radiant energy. Silver-cesium-oxide is typical of such materials. A cathode sleeve 3 extends rearwardly from the cathode 2, and an accelerating anode sleeve 4 is coaxially supported to extend rearwardly from the sleeve 3. A suitable support, such as a metallic washer 5, is used to secure the sleeve 4 to the wall of the envelope 1 as shown. Supported rearwardly and spaced from the accelerating anode 4 is an anode sleeve 6 which is secured to the envelope 1 by means of a suitable metallic mounting ring 7. This anode sleeve 6 is provided with a coaxial aperture 8 adjacent to the electrode 4, the entire structure thus far described being coaxial about and symmetrically arranged with respect to a tube axis 8. As will appear from the following description, this tube axis 8 constitutes the optical axis of the tube.

To the right-hand end of the anode sleeve 6 is a disc-shaped supporting plate 9 of metal to which is secured four upstanding metal posts 10 which, in turn, are attached to another annular plate 11 having an annular flange 12 which fits into the open right-hand end of the anode sleeve 6. This flange 12 is preferably welded to the anode sleeve 6 in such a position that the two plates 9 and 11 lie in planes normal to the tube axis 8.

The supporting plate 9 is more clearly shown in FIGS. 3 and 4. The central portion of the plate 9 is provided with an opening 13 which resembles a right-angle cross, this opening having four orthogonally related slot portions of rectangular shape as indicated by the numerals 14, 15, 16 and 17.

Welded to the underside of the supporting plate 9 and covering the central portion of the opening 13 is a square plate 18 which constitutes the first dynode element. The upper surface 19 of this plate 18 is suitably treated with a material having secondary electron emissive characteristics of greater than unity ratio, typical of such material being silver-magnesium. The supporting plate 9 may be stainless steel or some other suitable nonmagnetic material.

Across the left-hand face of the supporting plate 9 are stretched two conductive cross-hairs or wires 20 and 21 which are straight and cross each other at right angles. The crossing point 22 thereof coincides with the tube axis 8 as does the center of the dynode surface 19 as well as the cross-shaped opening 13 in the plate 9. The individual wires 20 and 21 diagonally cross the aperture 13 as shown in FIG. 3 so as to divide the dynode surface 19 into four quadrants I, II, III and IV as shown.

These wires 20 and 21 are supported in a plane normal to the tube axis 8 by means of suitable supporting elements such as the one indicated generally by the reference numeral 23. Since all four of the supporting elements for the two wires 20 and 21 may be identically constructed, a description of one will suffice for all. As shown in FIG. 4, the supporting plate 9 is provided with an aperture 24 into which is fitted a glass or the like bead 25. Centrally passing through and secured to the glass bead 25 is a suitable, rigid metallic post 26, and on the outside of the bead 25 is suitably secured a welding eyelet 27 which is welded or otherwise secured to the top of the plate 9. By means of this particular mounting, the crossed wires 20 and 21 are insulated from the plate 9.

Now considering the tube as shown in FIG. 1, the cross-wires 20 and 21 define a plane which is arranged to be perpendicular to the tube axis 8. This plane also coincides with the focal plane of the electron lens provided by the cathode 2, and the accelerating electrodes 4 and 6, respectively. Thus, an electron image emitted by the cathode 2 will be focused by means of this electron lens into the plane which is occupied by the crossed-wires 20 and 21. The importance of this design feature will be explained more fully later on.

Associated with each of the quadrant areas I, II, III and IV of the dynode surface 19 is provided a multi-stage electron multiplier, the four multipliers being indicated in FIG. 2 by the numerals 28, 29, 30 and 31. These four multipliers may be identically constructed such that a description of one will suffice for all. Taking, for example, the multiplier 31, it is composed of two ceramic or the like side plates 32 and 33 between which are supported the multiplier dynodes which are indicated generally by the numeral 34. Each of the multipliers is suitably mounted in the respective slot 14, 15, 16 and 17 of the plate 9, with the side plates 32 and 33 thereof being suitably secured to the suporting plate 9.

Each of the multipliers has a first dynode 34 which is positioned immediately above the first dynode surface 19 so as to be in a position to pick up secondary electrons emitted by the latter. The significance of this feature will become apparent from the subsequent description.

To the anodes 35 of each of the multipliers are connected four suitable electronic amplifiers as indicated by the numerals 36 and 37, only two such amplifiers being shown. The purpose of these amplifiers is to amplify any electrical signal which may be produced by the multipliers, respectively.

It may be stated at this point that each of the multipliers may consist of as many secondary electron emissive electrodes or dynodes, arranged in a conventional series manner as illustrated, or as otherwise desired, as may be needed to effect the required multiplication of the electron emission from the dynode 19. Each of the multipliers is provided adjacent the final secondary electron emissive electrode thereof with an electron collecting electrode or anode 35.

A typical electron multiplier construction which would be suitable for use in this invention is illustrated and described in Hans W. G. Salinger United States Patent No. 2,431,510. Each of the multiplier dynodes is connected to a power supply for the impression of the required operating potentials thereon, each of the dynodes as viewed in FIG. 1 having applied thereto successively higher potentials as viewed from left to right. This is well understood in the art and need not be further elaborated.

Potentials are applied to the various tube electrodes as shown in FIG. 1, a reference or ground potential being applied to cathode 2, a higher, positive potential being applied to the electrode 4, and a still higher potential being applied to the anode sleeve 6 as well as to the supporting plate 9. Applied to the two cross-wires 20 and 21 is a potential which is one or two volts negative with respect to that applied to the cathode 2.

It may now be stated that that portion of the tube of FIG. 1 to the left-hand side of the annular plate 11 is conventional and corresponds to the image tube which is disclosed in Carlo Patent No. 2,774,002. While this particular image tube configuration is used in the embodiment of the invention herein illustrated and described, still other image tube structures may be used such as the one found in Patent No. 2,708,250. The important thing with respect to this image tube section of the structure shown in FIG. 1 is that a radiant energy image focused onto the cathode 2 will result in the generation of an electron image which is focused by either electrostatic or electromagnetic means into a focal plane which is occupied by the crossed wires 20 and 21. Thus, the present invention is not limited to the particular image tube structure as shown in FIG. 1 to the left-hand side of the plane of the crossed wires 20 and 21. Similarly, with respect to the electron multipliers 28, 29, 30 and 31, any particular arrangement of these multipliers may be used without departing from the scope of this invention.

In operation, a radiant energy image which is focused onto the photocathode 2 produces an electron image which is focused by means of the internal tube electrodes 3, 4 and 6 into the plane of the crossed-wires 20 and 21. If the source of the radiant energy lies on the tube axis 8 extended, the electron image produced by the photocathode 2 will be focused precisely upon the cross-over point 22 of the two wires 20 and 21. Inasmuch as these two wires are biased negatively with respect to the photocathode 2, the beam of electrons which extends from the photocathode 2 will be equally divided four ways into the four quadrants I, II, III and IV, in which quadrants they will be deflected outwardly from the center 22 and will impinge the dynode surface 19. The impingement of the four portions of the beam with this dynode surface produces secondary emission from the latter which is picked up by each of the multipliers 28, 29, 30 and 31. Each of these multipliers thereby produces identical signals which are amplified and utilized by the output amplifiers 36 and 37. If the outputs of these amplifiers 36 and 37 were measured, the identity of the signals would be recognized, which identity could be used as an indication that the target as seen by the photocathode 2 lies on the tube axis 8.

Now if it is considered that the target seen by the photocathode 2 is in the form of a point source of light and is located such that the image is focused onto the upper portion of the cathode 2 as shown in FIG. 1, the electron image produced by the cathode will be focused through the tube into the plane of the wires 20 and 21 but more particularly into the quadrant between the two wires 20 and 21 indicated by the Roman numeral II in FIGS. 2 and 3. The negative field of these wires 20 and 21 will further deflect the electron beam away from the wires and away from center 22 into the quadrant II whereupon the electron beam will strike the dynode surface 19 in a region well separated from the quadrant boundaries on the dynode 19. Secondary emission from this quadrant II of the dynode surface 19 will be picked up by the multiplier 29 which in turn will produce an electrical signal. It will now be apparent that this electrical signal derived from multiplier 29 will indicate the quadrant position of the target seen by the photocathode 2.

If the position of the point source of light on the cathode 2 is such that the electron beam centers on one of the wires 20 or 21 at a location remote from center 22, the beam will oppositely divide into two portions which will impinge the respective two contiguous quadrants of the dynode surface. This will result in the excitation of respective two multipliers which thereby provide a signal respesentative of this particular beam location. Thus, if the beam should center on wire 20, outwardly from center 22, between quadrants I and IV, the beam will divide into two portions which will impinge dynode 19 in quadrants I and IV, respectively. Multipliers 28 and 31 will thereupon be excited producing a signal indicating this beam position.

Depending upon where an optical image of a distant target is focused onto the photocathode 2, the electron beam which is formed and focused onto the plane of the two wires 20 and 21 will be directed into one or two of the quadrants I, II, III and IV. A corresponding one or two of the multipliers 28, 29, 30 and 31 will thereby be excited into producing a signal, which signal will be indicative of the particular optical quadrant or portion of the photocathode II on which the target image is being projected.

At this point it should be noted that both the photocathode 2 and the dynode surface 19 are continuous or solid and are not divided into segments having spaces therebetween which would constitute dead areas. Instead, the entire surface of the photocathode 2 is sensitive to radiation, and there are no dead spots in the dynode surface 19 inasmuch as the electron beam will always impinge this surface in one of the particular quadrants I, II, III and IV. Thus, none of the electron beams as produced by the photocathode 2 is ever wasted or lost. This constitutes an efficiency not heretofore attainable in prior art devices.

Another important feature in this invention is the fact that the wires 20 and 21 always deflect the electron beam away from the crossed boundaries of the quadrants. This therefore means that secondary emission from the dynode surface 19 will always take place adjacent to the particular multipliers 28, 29, 30 and 31. Thus, if the primary electron beam strikes that portion of the dynode surface 19 in quadrant I, the emission from this surface is so close to the multiplier 28 that it could never accidentally or erroneously be picked up by any of the other multipliers 29, 30 and 31. Therefore, the wires 20 and 21 prevent the generation of a signal which erroneously indicates the position of a target seen by the photocathode 2.

In FIGS. 5 and 6 are illustrated a slightly different embodiment of the invention by which the offcenter extent of a target might be determined and measured. In these figures, like numerals indicate like parts. Circumferentially arranged around the tube envelope 1 are two pairs of deflection coils 38 and 39, respectively, which are orthogonally related. The coils 38 are adapted to deflect the electron beam in the tube vertically while the coils 39 deflect the beam horizontally. A suitable, variable source 40 of deflection voltage is coupled to the two coils 39 while a similar source 41 is coupled to the two coils 38. By means of varying the magnitude and polarity of the signals produced by the two sources 40 and 41, the electron beam may be swung in any direction inside the deflection coils 38 and 39. If it is desired to measure the current fed to the deflecting coils, a suitable ammeter 42 may be inserted in the circuit of the coils 39 and another ammeter 43 may be inserted in the circuit of the coils 38.

In the operation of the embodiment of FIGS. 5 and 6, if it is assumed that the electron beam is being directed into quadrant I, the signal source 40 is varied in a direction such that the beam will be centered onto the crossover point 22 of the wires 21. When this happens, all four of the multipliers 28, 29, 30 and 31 will produce equal signals which are indicative that the beam has been properly centered. The ammeter 42 may thereupon be read to determine the current required to center the beam, and this reading may be taken as an indication of the direction which the target seen by the photocathode 2 is off-center. If the electron beam were directed into any one of the other quadrants, either one or both of the signal sources 40 and 41 are varied until the beam is precisely centered, the readings on the meters 42 and 43 indicating the position of the target as seen by the photocathode 2. Obviously, automatic control mechanism may be used in conjunction with the sources 40 and 41 for maintaining the tube axis 8 directly on target at all times; however, such automatic mechanism is not important to the present invention.

While I have described above the principles of my invention in connection with specific apparatus, it is to be clearly understood that this description is made only by way of example and not as a limitation to the scope of my invention.

What is claimed is:

1. A target-locating tube comprising a tubular envelope having opposite ends and an axis extending between said ends, a photoelectric cathode having an extended area in one end of said envelope, said cathode lying in a plane substantially normal to said axis, means for focusing an electron image emitted by said cathode into a focal plane normal to said axis, a dynode having a continuous secondary emissive surface of extended area responsive to said electron image and supported in a plane substantially parallel to said focal plane on the side opposite said cathode, a pair of straight conductors connected to and crossing each other at right angles and being supported in said focal plane between said cathode and dynode, said pair of conductors lying in two intersecting planes, respectively, which are normal to each other and to said focal plane, said dynode surface being axially spaced from but adjacent to said pair of conductors and being divided into quadrants thereby, and four multistage electron multipliers, there being one of said multipliers in each of the quadrants defined by said two intersecting planes, said multipliers being operatively positioned with respect to said dynode surface to receive electrons emitted by said surface.

2. The target-locating tube of claim 1 including circuit means applying between said cathode and dynode a potential having a value at which electrons emitted by said cathode bombard said dynode surface and produce secondary emission therefrom, said circuit means including means applying a potential between said cathode and two conductors which deflects electrons away from the latter and onto said dynode surface.

3. A target-locating tube comprising a glass envelope having opposite ends and an axis extending between said ends, a photoelectric cathode of extended area in one end of said envelope, said cathode being centrally intersected by and lying in a plane substantially normal to said axis, electrode means in said tube for focusing an electron image emitted by said cathode in a focal plane normal to said axis, said electrode means including a tubular element coaxially disposed about said axis, a supporting plate mounted in said tube and lying in a plane transverse to said axis; said supporting plate being connected to and supported by said tubular element, said plate having a continuous secondary-emissive surface in the central portion thereof which is centrally intersected by and lies in a plane transverse to said axis, said secondary-emissive surface lying on the side of said focal plane opposite said cathode, a pair of wires crossing each other at right angles and being supported in said focal plane, said pair of wires also lying in two intersecting planes, respectively, which are normal to each other and to said focal plane and which divide said surface into quadrants, the line of intersection of said two intersecting planes coinciding with said axis, and four multistage electron multipliers mounted on said supporting plate, there being one of said multipliers in each of the quadrants defined by said two intersecting planes, said multipliers being operatively positioned with respect to said secondary-emissive surface to receive electrons emitted by said surface.

4. The tube of claim 3 and including two pairs of insulated supporting elements on said supporting plate, the supporting elements of each pair being spaced apart on opposite sides of said axis, said two wires being connected between respective pairs of said supporting elements.

5. The tube of claim 3 and including circuit means applying between said cathode and secondary emissive surface a potential having a value at which electrons emitted by said cathode bombard said dynode surface and produce secondary emission therefrom, said circuit means including means applying a potential between said cathode and said pair of wires which deflects electrons away from the latter and onto said secondary-emissive surface.

6. A target-locating tube comprising a tubular envelope having opposite ends and an axis extending between said ends, a photoelectric cathode having an extended area in one end of said envelope, said cathode being in a plane substantially normal to said axis and producing electrons in response to a source of radiant energy, means for forming said electrons into a beam and focusing said beam into a focal plane normal to said axis, a dynode having a continuous secondary-emissive surface of extended area responsive to said electrons and supported in a plane substantially parallel to said focal plane on the side opposite said cathode, a pair of straight conductors connected to and crossing each other at right angles and being supported in said focal plane between said cathode and dynode, said pair of conductors lying in two intersecting planes, respectively, which are normal to each other and to said focal plane, said dynode surface being axially spaced from but adjacent to said pair of conductors and being divided into quadrants thereby, four multistage electron multipliers, there being one of said multipliers in each of the quadrants defined by said two intersecting planes, said multipliers being operatively positioned with respect to said dynode surface to receive electrons emitted by said surface, means for orthogonally deflecting said beam in directions extending between diametrically opposite pairs of said quadrants, and means for controlling the deflection of said beam to direct it onto the cross-over point of said conductors.

7. A target-locating tube comprising a glass envelope having opposite ends and an axis extending between said ends, a photoelectric cathode of extended area in one end of said envelope, said cathode being centrally intersected by and lying in a plane substantially normal to said axis, electrode means in said tube for focusing an electron image emitted by said cathode in a focal plane normal to said axis, said electrode means including a tubular element coaxially disposed about said axis, a supporting plate mounted in said tube and lying in a plane transverse to said axis, said supporting plate being connected to and supported by said tubular element, said plate having a continuous secondary-emissive surface in the central portion thereof which is centrally intersected by and lies in a plane transverse to said axis, said secondary-emissive surface lying on the side of said focal plane opposite said cathode, a pair of wires crossing each other at right angles and being supported in said focal plane, said pair of wires also lying in two intersecting planes, respectively, which are normal to each other and to said focal plane, and which divide said surface into quadrants, the line of intersection of said two intersecting planes coinciding with said axis, four multistage electron multipliers mounted on said supporting plate, there being one of said multipliers in each of the quadrants defined by said two intersecting planes, said multipliers being operatively positioned with respect to said secondary-emissive surface to receive electrons emitted by said surface, two pairs of orthogonally arranged deflecting coils positioned around said envelope between said cathode and said focal plane, one pair of said coils being aligned in a direction parallel to the bisector of one pair of diametrically opposed quadrants, the other pair of said coils being aligned in a direction parallel to the bisector of the other pair of diametrically opposed quadrants, and circuit means connected to said coils for centering said electron image onto the cross-over point of said wires, said circuit means including means for determining the direction of deflection required to center said electron image onto said crossover point.

References Cited by the Examiner

UNITED STATES PATENTS

| 2,103,507 | 12/37 | Zworykin | 313—105 |
| 2,292,111 | 8/42 | Farnsworth | 313—65 |
| 2,433,700 | 12/47 | Larson | 313—95 |
| 2,840,738 | 6/58 | Kruper et al. | 313—78 |

FOREIGN PATENTS

| 152,978 | 3/38 | Germany. |
| 783,161 | 9/57 | Great Britain. |

OTHER REFERENCES

Barber et al.: IBM Technical Disclosure Bulletin, "Beam Switching Tube," vol. 1, No. 4, December 1958 (entire publication relied on).

Chai Yeh: "The Effect of Grid-Support Wires on Focusing Cathode Emission," Proc. of IRE, vol. 37, No. 7, July 1946 (pp. 444–447 relied on).

DAVID J. GALVIN, *Primary Examiner.*

JOHN W. HUCKERT, *Examiner.*